US009563511B1

(12) United States Patent
Foley et al.

(10) Patent No.: US 9,563,511 B1
(45) Date of Patent: Feb. 7, 2017

(54) PERFORMING INPUT/OUTPUT OPERATIONS ON A SET OF STORAGE DEVICES BASED ON SCALABLE INPUT/OUTPUT CREDITS

(71) Applicant: EMC Corporation, Hopkinton, MA (US)

(72) Inventors: Robert Foley, Clinton, MA (US); Peter Puhov, Shrewsbury, MA (US); Socheavy Heng, Cranston, RI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 94 days.

(21) Appl. No.: 14/662,385

(22) Filed: Mar. 19, 2015

(51) Int. Cl.
| G06F 11/20 | (2006.01) |
| G06F 11/10 | (2006.01) |
| G06F 3/06 | (2006.01) |
| G06F 11/14 | (2006.01) |

(52) U.S. Cl.
CPC ......... *G06F 11/1092* (2013.01); *G06F 3/0619* (2013.01); *G06F 3/0655* (2013.01); *G06F 3/0665* (2013.01); *G06F 3/0689* (2013.01); *G06F 11/1088* (2013.01); *G06F 11/1456* (2013.01); *G06F 11/2058* (2013.01); *G06F 3/061* (2013.01); *G06F 11/2094* (2013.01)

(58) Field of Classification Search
CPC ...... G06F 3/0613; G06F 3/061; G06F 3/0611; G06F 3/0655; G06F 3/0659; G06F 11/1076; G06F 11/1092; G06F 11/2053; G06F 11/2094
See application file for complete search history.

(56) References Cited

U.S. PATENT DOCUMENTS

| 5,892,915 | A | 4/1999 | Duso et al. | |
| 6,625,750 | B1 | 9/2003 | Duso et al. | |
| 7,979,572 | B1 | 7/2011 | Tran et al. | |
| 8,051,219 | B2* | 11/2011 | Yamaguchi | G06F 3/0613 710/117 |
| 8,090,789 | B1 | 1/2012 | O'Shea et al. | |
| 8,250,257 | B1* | 8/2012 | Harel | G06F 3/061 710/38 |
| 8,645,623 | B1 | 2/2014 | O'Shea et al. | |
| 9,298,493 | B1* | 3/2016 | Harel | G06F 9/46 |
| 2008/0092143 | A1* | 4/2008 | Koseki | G06F 3/061 718/105 |

(Continued)

*Primary Examiner* — Joseph Schell
(74) *Attorney, Agent, or Firm* — BainwoodHuang

(57) ABSTRACT

A technique configures data storage equipment to (i) allow host I/O operations to start on storage devices while a credit tally is less than a predefined credit quota and (ii) block host I/O operations from starting on the storage devices while the tally is greater than the quota. The technique further involves, while a rebuild procedure is not being performed on the storage devices, (i) allocating host I/O credits at equal weight to the tally upon starting host I/O operations and (ii) de-allocating the credits at equal weight from the tally upon completion of the operations. The technique further involves, while the rebuild procedure is being performed on the storage devices, (i) allocating host I/O credits at greater than equal weight to the tally upon starting host I/O operations and (ii) de-allocating the credits at greater than equal weight from the tally upon completion of the operations.

20 Claims, 6 Drawing Sheets

(56) References Cited

U.S. PATENT DOCUMENTS

2012/0066179 A1\* 3/2012 Saika ................. G06F 3/061
 707/634
2012/0173774 A1\* 7/2012 Lee ................. G06F 3/0611
 710/39

\* cited by examiner

PERFORMING INPUT/OUTPUT OPERATIONS ON A SET OF STORAGE DEVICES BASED ON SCALABLE INPUT/OUTPUT CREDITS

BACKGROUND

There is a limit to the number of input/output (I/O) accesses that can be effectively performed by a RAID (redundant array of inexpensive disks) group of disks at any one time. One conventional data storage system controls the number of I/O accesses that are currently performed on a RAID group of disks using credits. That is, each I/O request is considered to consume a certain number of credits depending on a type of the I/O request (e.g., a read request, a write request, a read-modify-write request, etc.) and the particular RAID level for the RAID group. When the system begins processing an I/O request, the system increases an overall credit count by the particular number of credits associated with that I/O request. Similarly, when the system finishes processing that I/O request, the system decreases the overall credit count by the particular number of credits associated with that I/O request.

To impose a limit on the number of I/O accesses that are currently performed on a RAID group, the system processes new I/O requests only when the overall credit count does not exceed a predefined credit threshold. If the overall credit count exceeds the predefined credit threshold, the system considers the RAID group to be fully loaded and temporarily blocks processing of new I/O requests. Once the overall credit count drops below the predefined credit threshold due to completion of one or more previously started I/O requests, the system allows processing of new I/O requests.

SUMMARY

Unfortunately, there are deficiencies to the above-described conventional approach to controlling the number of I/O accesses that are currently performed on a RAID group of disks. For example, the above-described conventional approach allows the RAID group of disks to be fully loaded even if the system is rebuilding a disk of the RAID group (i.e., reconstructing data that resided on a failed disk from data stored on remaining good disks). In such a situation, the I/O accesses required by the rebuild process can be outcompeted by I/O accesses from users of the data storage system. As a result, the rebuild process can be slowed to an unreasonable rate.

In contrast to the above-described conventional approach which allows a rebuild process to be slowed to an unreasonable rate by I/O accesses from users, improved techniques are directed to performing I/O operations on a set of storage devices based on scalable I/O credits. In particular, when there is no rebuild process performed on the set of storage devices, credits for I/O operations for host computers are accounted for at equal weight. However, when there is a rebuild process being performed on the set of storage devices, the credits for I/O operations for the host computers are accounted for at higher weight based on a scaling factor (i.e., at greater than equal weight). Such operation lowers the loading on the set of storage devices from host I/O operations during the rebuild process thus allowing the rebuild process to progress at an improved rate.

One embodiment is directed to a method of performing I/O operations on a set of storage devices. The method includes configuring the data storage equipment to (i) allow host I/O operations to start on the set of storage devices while a credit tally for the set of storage devices is less than a predefined credit quota and (ii) block host I/O operations from starting on the set of storage devices while the credit tally for the set of storage devices is greater than the predefined credit quota. The method further includes, after configuring the data storage equipment and during a first operational time period in which a rebuild procedure is not being performed on the set of storage devices, (i) allocating host I/O credits at equal weight to the credit tally upon starting first host I/O operations on the set of storage devices and (ii) de-allocating the host I/O credits at equal weight from the credit tally upon completion of the first host I/O operations on the set of storage devices. The method further includes, after the first operational time period and during a second operational time period in which the rebuild procedure is being performed on the set of storage devices, (i) allocating host I/O credits at greater than equal weight to the credit tally upon starting second host I/O operations on the set of storage devices and (ii) de-allocating the host I/O credits at greater than equal weight from the credit tally upon completion of the second host I/O operations on the set of storage devices.

In some arrangements, allocating the host I/O credits at greater than equal weight to the credit tally upon starting the second host I/O operations on the set of storage devices includes, when starting a particular second host I/O operation on the set of storage devices, multiplying an original host I/O credit value for the particular second host I/O operation by a scaling factor to form a scaled host I/O credit value for the particular second host I/O operation, and adding the scaled host I/O credit value for the particular second host I/O operation to the credit tally.

In some arrangements, de-allocating the host I/O credits at greater than equal weight from the credit tally upon completion of the second host I/O operations on the set of storage devices includes, when completing the particular second host I/O operation on the set of storage devices, subtracting the scaled host I/O credit value for the particular second host I/O operation from the credit tally.

In some arrangements, allocating the host I/O credits at equal weight to the credit tally upon starting the first host I/O operations on the set of storage devices includes, when starting a particular first host I/O operation on the set of storage devices, adding an original host I/O credit value for the particular first host I/O operation to the credit tally without using the scaling factor. In these arrangements, de-allocating the host I/O credits at equal weight from the credit tally upon completion of the first host I/O operations on the set of storage devices includes, when completing the particular first host I/O operation on the set of storage devices, subtracting the original host I/O credit value for the particular first host I/O operation from the credit tally.

In some arrangements, the method further includes, during the second operational time period and while the second host I/O operations are being performed on the set of storage devices, performing reconstruction I/O operations on the set of storage devices to reconstruct data on the set of storage devices.

In some arrangements, the method further includes, during the second operational time period and while the second host I/O operations are being performed on the set of storage devices, (i) allocating reconstruction I/O credits at equal weight to the credit tally upon starting the reconstruction I/O operations on the set of storage devices, and (ii) de-allocating the reconstruction I/O credits at equal weight from the credit tally upon completion of the reconstruction I/O operations on the set of storage devices.

In some arrangements, multiplying the original host I/O credit value for the particular second host I/O operation by the scaling factor to form the scaled host I/O credit value for the particular second host I/O operation includes multiplying the original host I/O credit value for the particular second host I/O operation by an integer N to form the scaled host I/O credit value for the particular second host I/O operation, the integer N being greater than 1, and the scaled host I/O credit value being N times greater than the original host I/O credit value.

In some arrangements, the scaling factor is originally set to an integer M which is greater than 1 and which is different than the integer N. In these arrangements, the method further includes, during the first operational time period, receiving a scaling factor change command from a user and, in response to the scaling factor change command from the user, modifying the scaling factor from the integer M to the integer N.

In some arrangements, the method further includes, during the first operational time period, performing the first host I/O operations on the set of storage devices to enable an external host to access host information on the set of storage devices. Here, the method further includes, during the second operational time period, performing the second host I/O operations and reconstruction I/O operations on the set of storage devices to concurrently enable the external host to access the host information on the set of storage devices and reconstruct data on the set of storage devices.

In some arrangements, the method further includes, after completion of the rebuild procedure and during a third operational time period following the second operational time period, (i) allocating host I/O credits at equal weight to the credit tally upon starting third host I/O operations on the set of storage devices and (ii) de-allocating the host I/O credits at equal weight from the credit tally upon completion of the third host I/O operations on the set of storage devices.

Another embodiment is directed to data storage equipment which includes an interface, memory including a set of storage devices, and processing circuitry coupled to the interface and to the memory. The memory stores instructions which, when carried out by the control circuitry, cause the processing circuitry to:

(A) receive, through the interface, configuration to (i) allow host I/O operations to start on the set of storage devices while a credit tally for the set of storage devices is less than a predefined credit quota and (ii) block host I/O operations from starting on the set of storage devices while the credit tally for the set of storage devices is greater than the predefined credit quota, (B) after receiving the configuration and during a first operational time period in which a rebuild procedure is not being performed on the set of storage devices, (i) allocate host I/O credits at equal weight to the credit tally upon starting first host I/O operations on the set of storage devices and (ii) de-allocate the host I/O credits at equal weight from the credit tally upon completion of the first host I/O operations on the set of storage devices, and (C) after the first operational time period and during a second operational time period in which the rebuild procedure is being performed on the set of storage devices, (i) allocate host I/O credits at greater than equal weight to the credit tally upon starting second host I/O operations on the set of storage devices and (ii) de-allocate the host I/O credits at greater than equal weight from the credit tally upon completion of the second host I/O operations on the set of storage devices.

Yet another embodiment is directed to a computer program product having a non-transitory computer readable medium which stores a set of instructions to perform input/output (I/O) operations on a set of storage devices. The set of instructions, when carried out by computerized circuitry, causes the computerized circuitry to perform a method of:

(A) configuring data storage equipment to (i) allow host I/O operations to start on the set of storage devices while a credit tally for the set of storage devices is less than a predefined credit quota and (ii) block host I/O operations from starting on the set of storage devices while the credit tally for the set of storage devices is greater than the predefined credit quota;

(B) after configuring the data storage equipment and during a first operational time period in which a rebuild procedure is not being performed on the set of storage devices, (i) allocating host I/O credits at equal weight to the credit tally upon starting first host I/O operations on the set of storage devices and (ii) de-allocating the host I/O credits at equal weight from the credit tally upon completion of the first host I/O operations on the set of storage devices; and (C) after the first operational time period and during a second operational time period in which the rebuild procedure is being performed on the set of storage devices, (i) allocating host I/O credits at greater than equal weight to the credit tally upon starting second host I/O operations on the set of storage devices and (ii) de-allocating the host I/O credits at greater than equal weight from the credit tally upon completion of the second host I/O operations on the set of storage devices.

It should be understood that, in the cloud context, certain electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in performing I/O operations on a set of storage devices based on scalable I/O credits.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to performing input/output (I/O) operations on a set of storage devices based on scalable I/O credits where the I/O credits are used to control loading of the set of storage devices. In particular, when there is no rebuild process performed on the set of storage devices, I/O credits for I/O operations for host computers are accounted for at equal weight (i.e., as is without scaling). However, when there is a rebuild process being performed on the set of storage devices, the I/O credits for I/O operations for the host computers are accounted for at higher weight based on a scaling factor (e.g., N times where N is an integer greater than 1). Such operation reduces the loading on the set of storage devices from host I/O operations during the rebuild process thus allowing the rebuild process to make effective progress.

Figure 1:
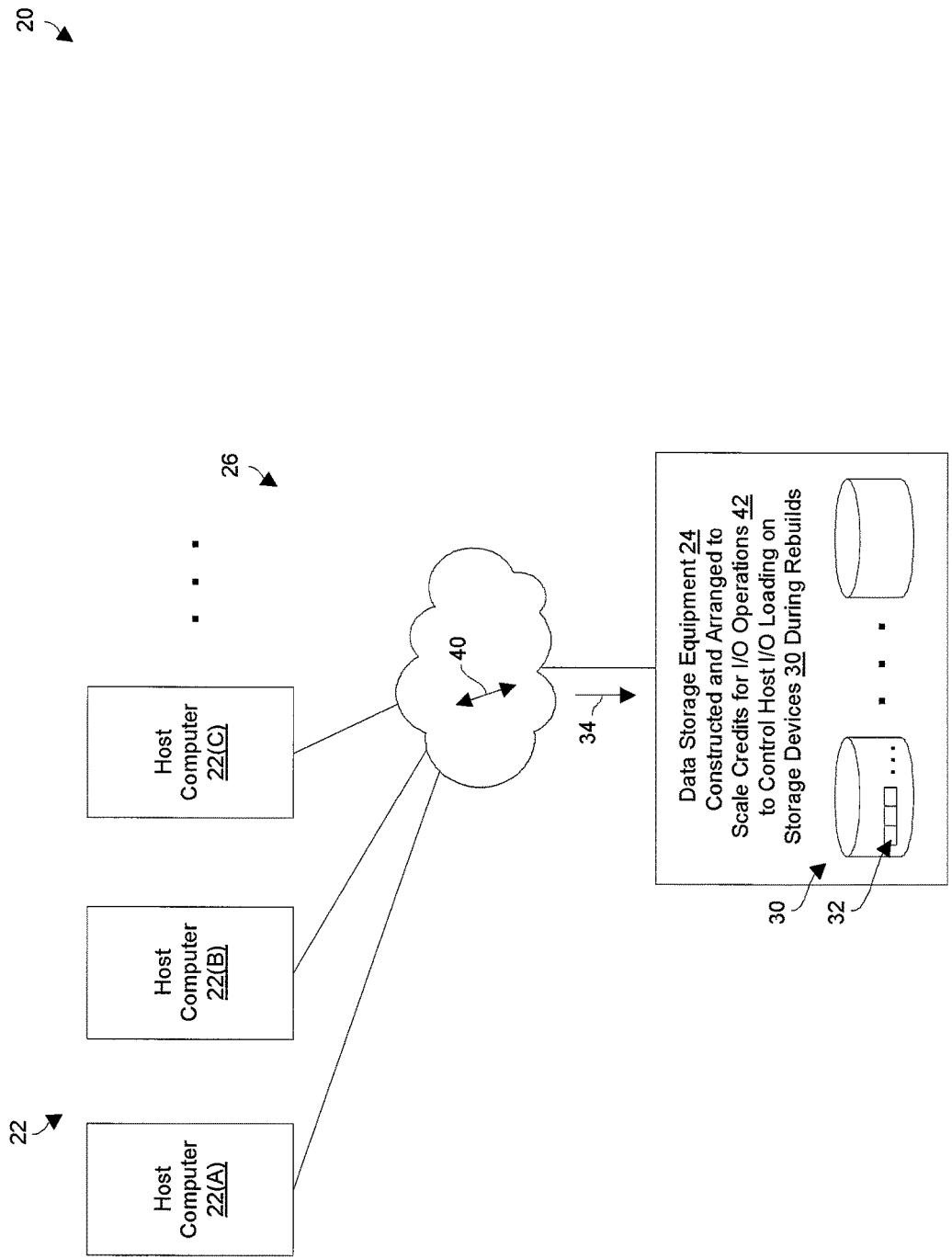
FIG. 1 is a block diagram of an electronic environment which is suitable for performing I/O operations on a set of storage devices while managing scalable credits.

FIG. 1 shows an electronic environment 20 which is suitable for performing I/O operations on a set of storage devices while managing scalable credits to control loading of the set of storage devices. The electronic environment 20 includes host computers 22(A), 22(B), 22(C), . . . (collectively, host computers 22), data storage equipment 24, and communications medium 26.

Each host computer 22 is constructed and arranged to perform useful work. Along these lines, a host computer 22 may be a server device such as an enterprise server, a file server, an email server, a web server, a content server, an application server, and so on. Alternatively, a host computer 24 may be a client device such as a desktop computer, a tablet, a smartphone, etc. Such host computers 24 may store host data in and retrieve host data from the data storage equipment 24.

The data storage equipment 24 is constructed and arranged to provide robust and reliable access to host data on behalf of the host computers 22. In particular, the data storage equipment 24 implements a level of fault tolerance on a set of storage devices 30 (e.g., flash memory boards, flash memory storage drives, magnetic storage drives, etc.) which allows the data storage equipment 24 to sustain a storage device failure without losing data 32. Along these lines, if a particular storage device 30 fails, the data storage equipment 24 performs a rebuild procedure to reconstruct the data 32 that resided on the failed storage device 30 (e.g., host data, parity data, operating system and support data, other metadata, combinations thereof, etc.). Such data reconstruction can occur while the data storage equipment 24 remains available to respond to host I/O commands 34 from the host computers 22, i.e., high availability.

To this end, the data storage equipment 24 may manage the set of storage devices 30 as a RAID (redundant array of inexpensive disks) group. For example, RAID 5 provides block-level striping which enables the data 32 that resided on a failed storage device 30 to be reconstructed on a spare storage device 30 via RAID algorithms and parity data (i.e., XOR operations). As another example, RAID 1 provides device mirroring which enables the data 32 that resided on a failed storage device 30 to be reconstructed on a spare storage device 30 by copying the data 32 from the remaining storage device 30 to a spare storage device 30. Other RAID levels and/or data redundancy/protection schemes are suitable for use as well.

In some arrangements, the data storage equipment 24 provides block-based storage by storing the data 32 in blocks of logical storage units (LUNs) or volumes and addressing the blocks using logical block addresses (LBAs). In other arrangements, the data storage equipment 24 provides file-based storage by storing the data 32 as files of a file system and locating file data using inode structures. In yet other arrangements, the data storage equipment 24 stores LUNs and file systems, stores file systems within LUNs, and so on.

The communications medium 26 is constructed and arranged to connect the various components of the electronic environment 20 together to enable these components to exchange electronic signals 40 (e.g., see the double arrow 40). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic communications devices and cabling, wireless communications devices, combinations thereof, etc. Furthermore, the communications medium 26 is capable of supporting LAN-based communications, SAN-based communications, cellular communications, combinations thereof, etc.

During operation, the data storage equipment 24 performs useful work such as performing host initiated I/O operations 42 in response to host I/O commands 34 from the host computers 22. During such operation, the data storage equipment 24 is configured to (i) allow host I/O operations 42 to start on the set of storage devices 30 while a credit tally for the set of storage devices 30 is less than a predefined credit quota and (ii) block host I/O operations 42 from starting on the set of storage devices 30 while the credit tally for the set of storage devices 30 is greater than or equal to the predefined credit quota.

In particular, while the data storage equipment 24 is in a normal operating mode (or state) in which the data storage equipment 24 is not performing a rebuild procedure (i.e., there are no storage device failures and there is no reconstruction of any data), the data storage equipment 24 simply performs host I/O operations 42 on the set of storage devices 30 to enable the host computers 22 to access data 32 on the set of storage devices 30 and accounts for the host I/O operations 42 at equal weight. That is, when the data storage equipment 24 is ready to start a new host I/O operation 42, the data storage equipment 24 compares the current credit tally to the predefined credit quota for the set of storage devices 30. If the current credit tally is less than the predefined credit quota, the data storage equipment 24 starts the new host I/O operation 42. However, if the credit tally is greater than or equal to the predefined credit quota, the data storage equipment 24 blocks the new host I/O operation 42 from starting (e.g., the new host I/O operation 42 must wait or be retried).

As each new host I/O operation 42 is started, the data storage equipment 24 allocates host I/O credits for that new host I/O operation 42 at equal weight to the credit tally upon. When the data storage equipment 24 completes each host I/O operation 42, the data storage equipment 24 de-allocates the host I/O credits for that host I/O operation 42 at equal weight from the credit tally.

However, now suppose that one of the storage devices 30 fails. In response to the failure, the data storage equipment 24 performs a rebuild procedure. In particular, the data storage equipment 24 reconstructs the data 32 that resided on the failed storage device 30 from the data 32 of the remaining storage devices 30 and stores the reconstructed data 32 on a spare storage device 30 (i.e., a hot spare storage device 30). While the data storage equipment 24 is in this rebuilding mode or state, the data storage equipment 24 is still able to process host I/O commands 34 from the host computers 22. Along these lines, as the data storage equipment 24 starts each new host I/O operation 42, the data storage equipment 24 accounts for that host I/O operation 42 using scaled host I/O credits. That is, while the data storage equipment 24 is in the rebuild mode, the data storage equipment 24 allocates host I/O credits at greater than equal weight to the credit tally upon starting host I/O operations 42 and de-allocates the host I/O credits at greater than equal weight from the credit tally upon completion of the host I/O operations 42. Accordingly, the data storage equipment 24 maintains more I/O capacity for the rebuild procedure to ensure that the data storage equipment 24 makes effective progress reconstructing the lost data 32. Further details will now be provided with reference to FIG. 2.

Figure 2:
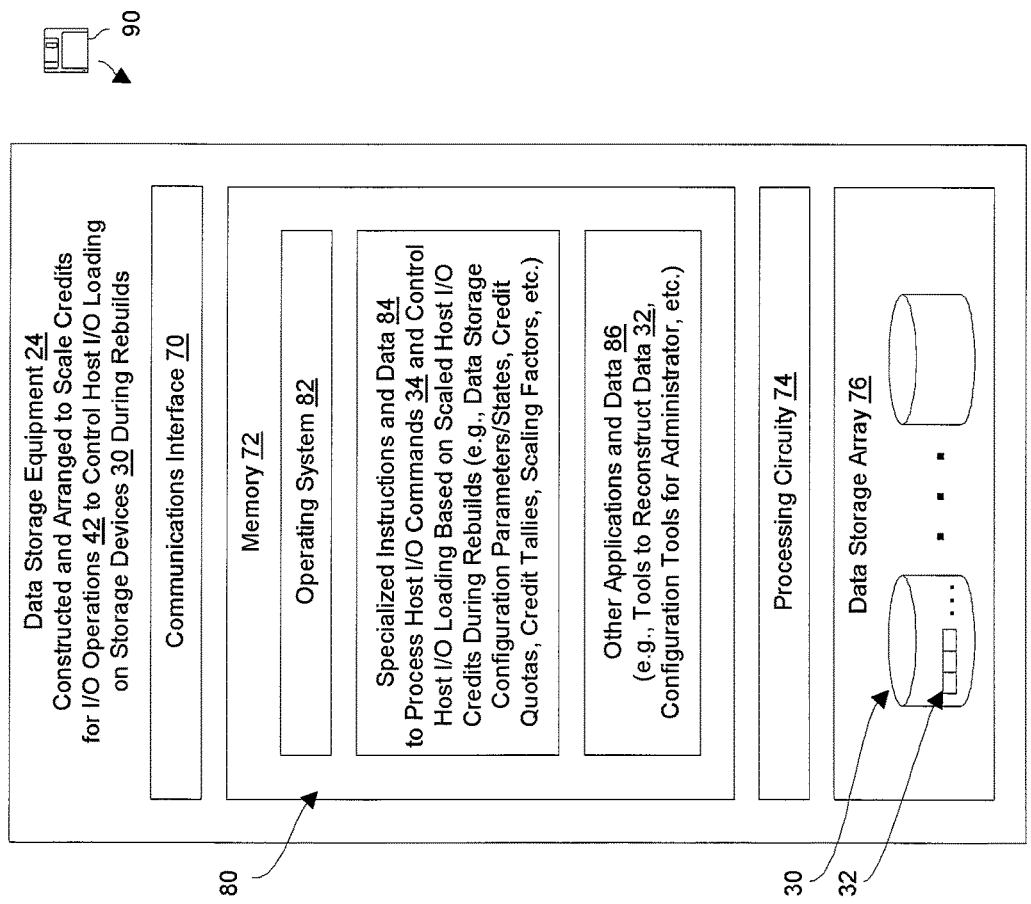
FIG. 2 is a block diagram of particular details of data storage equipment of the electronic environment of FIG. 1.

FIG. 2 shows particular details of the data storage equipment 24 of FIG. 1. The data storage equipment 24 includes a communications interface 70, memory 72, processing circuitry 74, and a data storage array 76.

The communications interface 70 is constructed and arranged to connect the data storage equipment 24 to the communications medium 26 to enable communications with other components of the electronic environment 20 (FIG. 1). Such communications may be IP-based, SAN-based, cellular-based, cable-based, fiber-optic based, wireless, combinations thereof, and so on. Accordingly, the communications interface 70 enables the data storage equipment 24 to robustly and reliably communicate with external devices such as the host computers 22.

The memory 72 is intended to represent both volatile storage (e.g., DRAM, SRAM, etc.) and non-volatile storage (e.g., flash memory, magnetic memory, etc.). The memory 72 stores a variety of software constructs 80 including an operating system 82 to manage resources of the data storage equipment 22, specialized instructions and data 84 to process host I/O commands 34 and control host I/O loading based on scaled host I/O credits during rebuild procedures, and other applications and data 86 (e.g., tools to reconstruct data 32, configuration and management tools for a data storage administrator, utilities, other user level applications, and so on).

The processing circuitry 74 is constructed and arranged to operate in accordance with the various software constructs 80 stored in the memory 72. Such processing circuitry 74 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the data storage equipment 24. In particular, the computer program product 90 has a non-transitory (or non-volatile) computer readable medium which stores a set of instructions which controls one or more operations of the data storage equipment 24. Examples of suitable computer readable storage media include tangible articles of manufacture and apparatus which store instructions in a non-volatile manner such as CD-ROM, flash memory, disk memory, tape memory, and the like.

The data storage array 76 houses the set of storage devices 30. In some arrangements, the data storage array 76 includes multiple array enclosures for high capacity storage (e.g., multiple RAID groups, tiered storage, etc.).

During operation, the data storage equipment 24 performs useful work. In particular, the processing circuitry 74 executes the various software constructs 80 to form specialized storage processing circuitry which loads and stores host data on behalf of the external host computers 22 (also see FIG. 1). During such operation, the processing circuitry 74 executes other code such as the specialized instructions and data 84 to process host I/O commands 34. In particular, while executing the specialized instructions and data 84, the processor forms specialized circuitry which controls host I/O loading on the data storage array 76. The specialized circuitry accounts for host I/O credits at equal weight as long as the data storage equipment 24 is not in a rebuild process. However, if the data storage equipment 24 performs a rebuild process, the specialized circuitry accounts for host I/O credits at greater than equal weight using a scaling factor. As a result, during a rebuild process, the loading on the data storage array 76 from host I/O commands 34 is throttled back to reserve extra I/O loading capacity that enables the rebuild process to make effective progress. Specifically, during a time of heavy host I/O operations, it is likely that at least some of the host I/O operations will be blocked because the current I/O credit tally exceeds the predefined I/O credit quota. Such operation allows reconstruction I/O operations to proceed rather than be outcompeted by the host I/O operations. Further details will now be provided with reference to FIG. 3 and an example.

Figure 3:
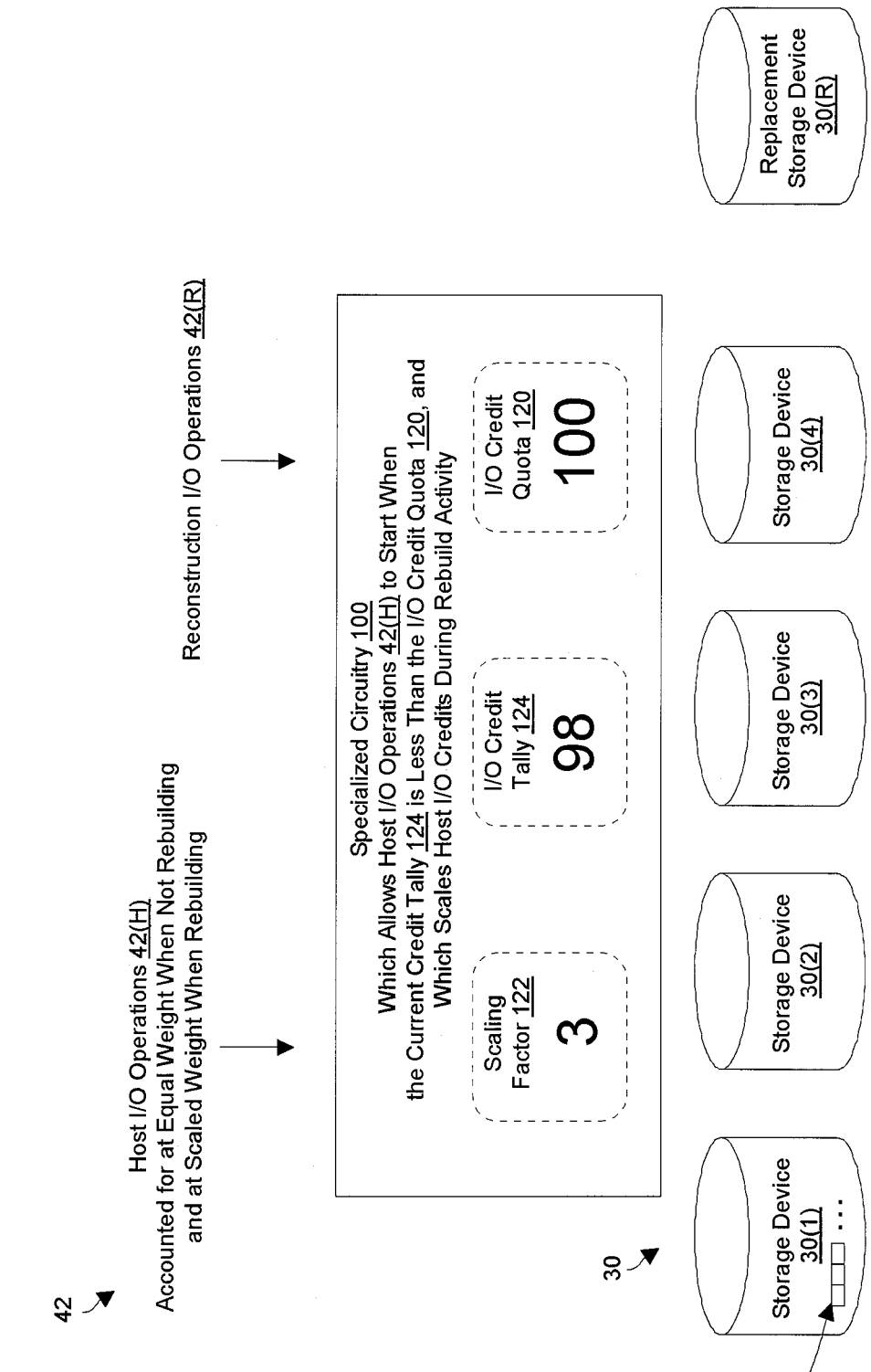
FIG. 3 is a block diagram of specialized circuitry of the data storage equipment of FIG. 2.

FIG. 3 shows a portion of the data storage equipment 24 which is responsible for controlling I/O loading on the set of storage devices 30. In particular, FIG. 3 shows the specialized circuitry 100 which is formed when the processing circuitry 74 executes in accordance with the specialized code and data 84 (also see FIG. 2). As shown in FIG. 3, the specialized circuitry 100 manages I/O operations 42 which access data 32 on a set of storage devices 30(1), 30(2), 30(3), 30(4), and 30(R).

By way of example only, the storage devices 30(1), 30(2), 30(3), 30(4) operate as a RAID group to store the data 32, and the storage device 30(R) operates as a hot spare, i.e., an unused storage device on hot standby. Further, by way of example, each storage device 30 is deemed to be able to support 25 I/O credits concurrently, i.e., each storage device 30 contributes an in-flight I/O capacity that is measured by 25 I/O credits. In this example, the specialized circuitry 100 sums the individual I/O credit contribution from each storage device 30 of the RAID group to produce an overall I/O capacity measure for the RAID group of 100 I/O credits (i.e., 25×4 because there are four storage devices 30 in the RAID group). Accordingly, the I/O credit quota 120 for the RAID group is 100 I/O credits.

During an initial configuration time, a user (e.g., a data storage administrator) sets the scaling factor 122 for host I/O credits to be the integer 3. Accordingly, each host I/O operation 42(H) that starts while there is no rebuild process being performed on the RAID group results in equal weighting of host I/O credits. However, as will now be explained in further detail, each host I/O operation 42(H) that starts while there is a rebuild process being performed on the RAID group results in greater scaled weighting of host I/O credits. In particular, during the rebuild process, the specialized circuitry 100 weights the host I/O credits for each host I/O operation 42(H) to be three times (3×) the normal weight.

It should be understood that the scaling factor 122 is adjustable and can be modified by the user. For example, at a later time, the user may change the value of the initial scaling factor 122 (e.g., 3) to a different value (e.g., 2, 4, 5, etc.). To make such a change, the user may invoke a data storage management tool (also see the other applications and data 86 in FIG. 2).

Now, during normal operation in which the data storage equipment 24 processes host I/O operations 42(H), the specialized circuitry 100 monitors the current value of the I/O credit tally 124 with respect to the I/O credit quota 122. As long as the current I/O credit tally 124 is less than the I/O credit quota 122, the specialized circuitry 100 allows new host I/O operations 42(H) to start. Also, as each new host I/O operation 42(H) starts, the specialized circuitry 100 adds the host I/O credits for that host I/O operation 42(H) to the current credit tally 124 at equal weight. Furthermore, as each new host I/O operation 100(H) completes, the specialized circuitry 100 subtracts the host I/O credits for that host I/O operation 42(H) from the current credit tally 124 at equal weight.

For example, suppose that the initial I/O credit tally 124 is 0 (i.e., there are no I/O operations 42 currently being performed). Next, suppose that the specialized circuitry 100 receives an initial series of requests to perform host I/O operations 42(H). In particular, the specialized circuitry 100 receives a request to perform a first host I/O operation 42(H) that consumes 4 host I/O credits (i.e., the first host I/O operation 42(H) has an equal weight value of 4 host I/O credits). Here, the specialized circuitry 100 adds 4 to the current I/O credit tally 124 and allows the first host I/O operation 42(H) to start. Similarly, the specialized circuitry 100 receives a request to perform a second host I/O operation 42(H) that consumes 16 host I/O credits. Here, the specialized circuitry 100 adds 16 to the current I/O credit tally 124 so the current I/O credit tally 124 is now 20, and allows the second host I/O operation 42(H) to start, and so on.

When the first host I/O operation 42(H) which consumes 4 host I/O credits completes, the specialized circuitry 100 subtracts 4 from the current I/O credit tally 124. Likewise, when the second host I/O operation 42(H) which consumes 16 host I/O credits completes, the specialized circuitry 100 subtracts 16 from the current I/O credit tally 124, and so on.

As long as the value of the current I/O credit tally 124 remains less than the I/O credit quota 120, the specialized circuitry 100 allows new host I/O operations 42(H) to start. By way of example and as shown in FIG. 3, the current value of the I/O credit tally 124 for the RAID group is 98 which is less than the value of the I/O credit quota 120 so the next host I/O operation 42(H) is allowed to start. However, if the current I/O credit tally 124 becomes greater than or equal to the I/O credit quota 120, the specialized circuitry 100 blocks new host I/O operations 42(H) from starting until enough I/O credits are subtracted from the I/O credit tally 124 (due to completion of I/O operations 42) that the current I/O credit tally 124 is again less than the I/O credit quota 120. Such operation can continue indefinitely as long as the data storage equipment 24 does not need to perform a rebuild.

However, now suppose that the data storage equipment 24 suffers a failure of one of the storage devices 30 in the RAID group, and the data storage equipment 24 begins a rebuild procedure. Along these lines, the data storage equipment 24 invokes the replacement storage device 30(R) which was on hot standby, and begins to reconstruct the data 32 that resided on the failed storage device 30 and store the reconstructed data 32 on the replacement storage device 30(R). In this situation, the specialized circuitry 100 transitions from a normal operating mode to a special rebuild mode in which the host I/O credits for new host I/O operations 42(H) are now scaled by the scaling factor 122 before being added to the I/O credit tally 124.

Accordingly, suppose that the specialized circuitry 100 receives a request for a new host I/O operation 42(H) and that the number of host I/O credits for that new host I/O operation 42(H) is 4 (i.e., the equal weight host I/O credits for the new host I/O operation 42(H) is 4). First, the specialized circuitry 100 compares the value of the I/O credit tally 124 to the I/O credit quota 120. If the current I/O credit tally 124 is greater than or equal to the I/O credit quota 120, the specialized circuitry 100 blocks the new host I/O operations 42(H) from starting. However, if the current I/O credit tally 124 is less than the I/O credit quota 120, the specialized circuitry 100 allows the new host I/O operation 42(H) to start. In particular, if the new host I/O operations 42(H) is allowed to start, the specialized circuitry 100 multiplies the number of host I/O credits for that new host I/O operation 42(H) (recall that it is 4 at equal weight) by the scaling factor 122 which is 3. Accordingly, the scaled number of host I/O credits for the new host I/O operation 42(H) is 12 (i.e., 4×3=12), and the specialized circuitry 100 adds this scaled value of 12 to the I/O credit tally. Also, when the host I/O operation 42(H) completes, the specialized circuitry 100 subtracts the scaled value of host I/O credits for that host I/O operation 42(H) (i.e., 12) from the current I/O credit tally 124. As a result, while the data storage equipment 24 is rebuilding data 32, the specialized circuitry 100 reserves capacity to enable the rebuild to make effective progress.

In some arrangements, the specialized circuitry 100 adds reconstruction I/O credits to the current I/O credit tally 124 when the reconstruction I/O operations 42(R) start, and subtracts to the reconstruction I/O credits from the current I/O credit tally 124 when the reconstruction I/O operations 42(R) complete. Accordingly, the specialized circuitry 100 is able to control whether a new host I/O operation 42(H) starts based on both the host I/O operations 42(H) and the reconstruction I/O operations 42(R) that are currently being performed on the RAID group.

In some arrangements, the specialized circuitry 100 does not block reconstruction I/O operations 42(R) from starting. Accordingly, only the host I/O operations 42(H) can be outcompeted while the data storage equipment 24 is performing a rebuild. Such operation alleviates having to reschedule the reconstruction I/O operations 42(R).

In some arrangements, the specialized circuitry 100 does not scale the reconstruction I/O credits when adding the reconstruction I/O credits to the current I/O credit tally 124 and when subtracting the reconstruction I/O credits from the current I/O credit tally 124. Accordingly, the specialized circuitry 100 only reserves I/O capacity for host I/O operations 42(H), i.e., the set of storage devices 30 can be fully loaded with reconstruction I/O operations 42(R).

It should be understood that other values for the scaling factor 122 are suitable for use (e.g., 2, 4, 5, non-integer values, etc.). Additionally, the RAID group can include a different number of storage devices 30 (e.g., 2, 3, 5, etc.). Furthermore, the credits for each I/O operation may vary due to particular details of that I/O operation (e.g., read, write, read-modify-write, etc.).

In some arrangements, the specialized circuitry 100 manages I/O operations 42 based on I/O credits at the storage device level rather than the RAID group level (i.e., at storage device granularity). In these arrangements, the specialized circuitry 100 maintains an I/O credit tally 124 for each storage device 30 rather than for each RAID group. Accordingly, for each storage device 30, the specialized circuitry 100 compares the current I/O credit tally 124 for that storage device 30 to the I/O credit quota 120 for that storage device 30 (e.g., 25 I/O credits for each individual storage device 30) and starts or blocks host I/O operations 42 to that storage device 30 based on whether that current I/O tally 124 is less than that I/O credit quota 120. Further details will now be provided with reference to FIG. 4.

Figure 4:
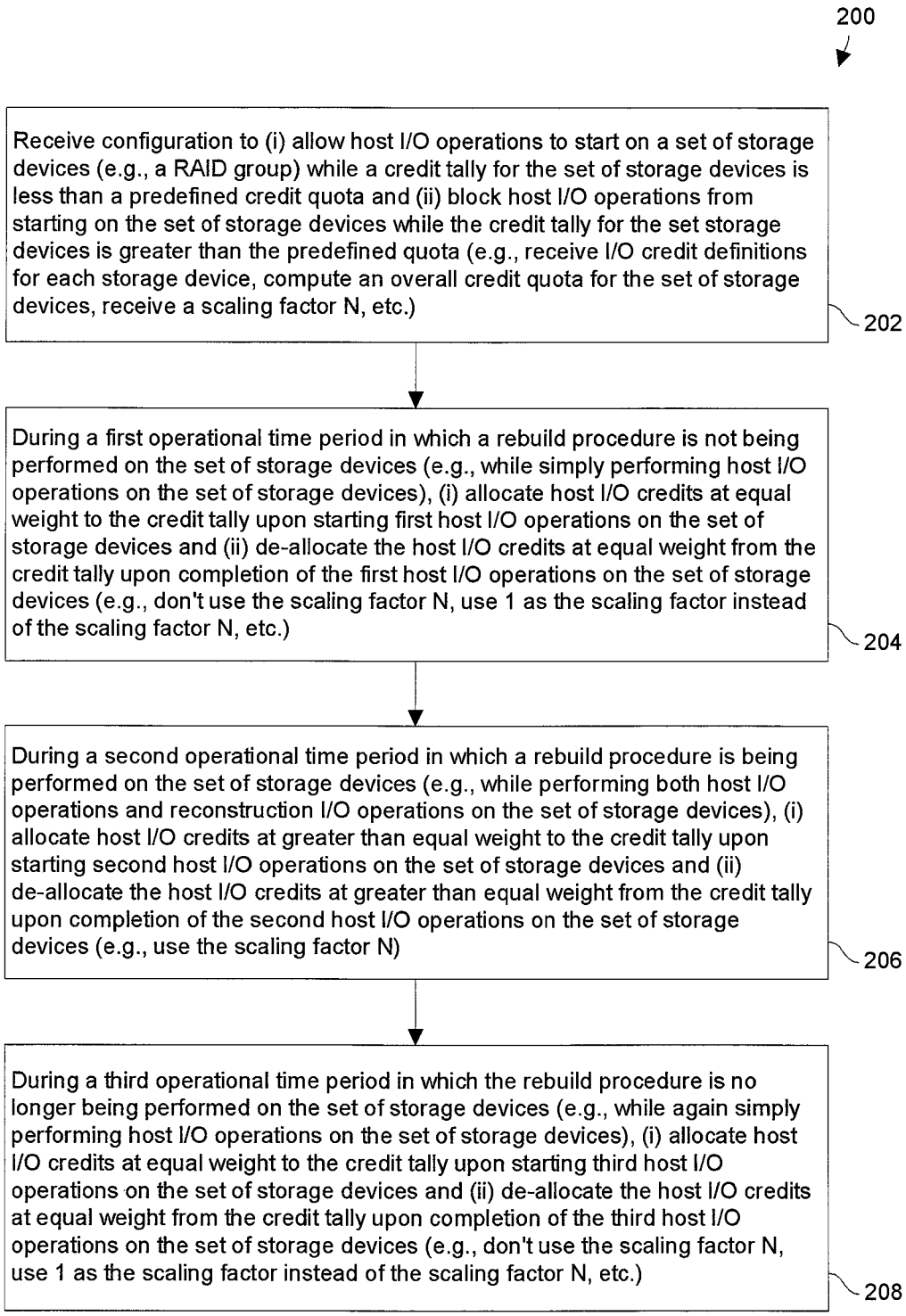
FIG. 4 is a flowchart of a procedure which is performed by the data storage equipment of FIG. 2.

FIG. 4 is a flowchart of a procedure 200 which is performed by the data storage equipment 24 when performing I/O operations on a set of storage devices. At 202, the the data storage equipment 24 receives configuration to (i) allow host I/O operations to start on the set of storage devices while a credit tally for the set of storage devices is less than a predefined credit quota and (ii) block host I/O operations from starting on the set of storage devices while the credit tally for the set of storage devices is greater than (or equal to) the predefined credit quota.

At 204, the data storage equipment 24, during a first operational time period in which a rebuild procedure is not being performed on the set of storage devices, (i) allocates host I/O credits at equal weight to the credit tally upon starting first host I/O operations on the set of storage devices and (ii) de-allocates the host I/O credits at equal weight from the credit tally upon completion of the first host I/O operations on the set of storage devices. Here, the data storage equipment 24 performs the first host I/O operations on the set of storage devices to enable an external host to access host information on the set of storage devices. Along these lines, the data storage equipment 24, when starting a particular first host I/O operation on the set of storage devices, adds an original host I/O credit value for the particular first host I/O operation to the credit tally without using the scaling factor. Likewise, the data storage equipment 24, when completing the particular first host I/O operation on the set of storage devices, subtracts the original host I/O credit value for the particular first host I/O operation from the credit tally.

At 206, the data storage equipment 26, during a second operational time period in which the rebuild procedure is being performed on the set of storage devices, (i) allocates host I/O credits at greater than equal weight to the credit tally upon starting second host I/O operations on the set of storage devices and (ii) de-allocates the host I/O credits at greater than equal weight from the credit tally upon completion of the second host I/O operations on the set of storage devices. Here, the data storage equipment 24 performs both the second host I/O operations and reconstruction I/O operations on the set of storage devices to concurrently enable the external host to access the host information on the set of storage devices and reconstruct data on the set of storage devices. Along these lines, the data storage equipment 24, when starting a particular second host I/O operation on the set of storage devices, multiplies an original host I/O credit value for the particular second host I/O operation by a scaling factor (e.g., an integer greater than 1) to form a scaled host I/O credit value for the particular second host I/O operation, and adds the scaled host I/O credit value for the particular second host I/O operation to the credit tally. Additionally, the data storage system 24, when completing the particular second host I/O operation on the set of storage devices, subtracts the scaled host I/O credit value for the particular second host I/O operation from the credit tally.

It should be understood that once the rebuild procedure completes, the data storage equipment 24 returns to using host I/O credits at equal weight. To illustrate this aspect, at 208, the data storage equipment 24, during a third operational time period in which a rebuild procedure is no longer being performed on the set of storage devices, (i) allocates host I/O credits at equal weight to the credit tally upon starting first host I/O operations on the set of storage devices and (ii) de-allocates the host I/O credits at equal weight from the credit tally upon completion of the first host I/O operations on the set of storage devices. Further details will now be provided with reference to FIGS. 5 and 6.

Figure 5:
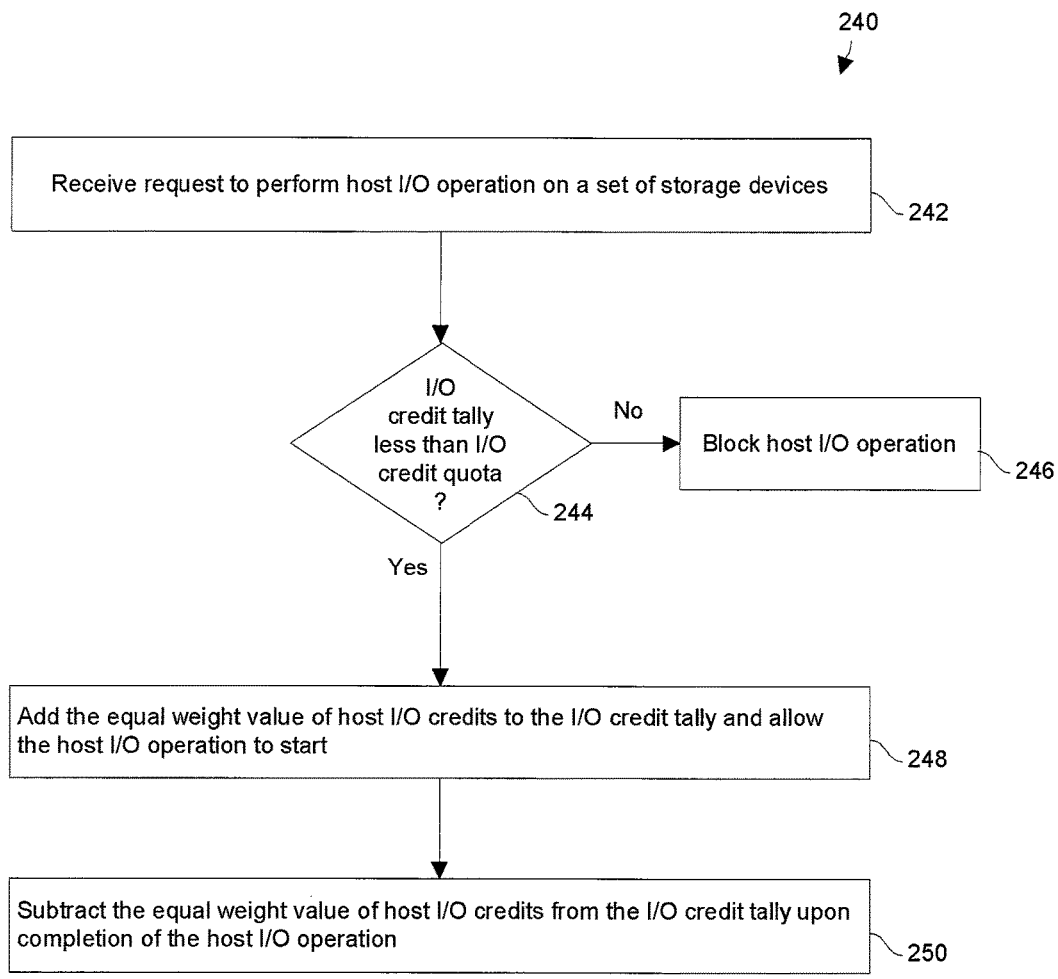
FIG. 5 is a flowchart of a particular portion of the procedure of FIG. 4.
Figure 6:
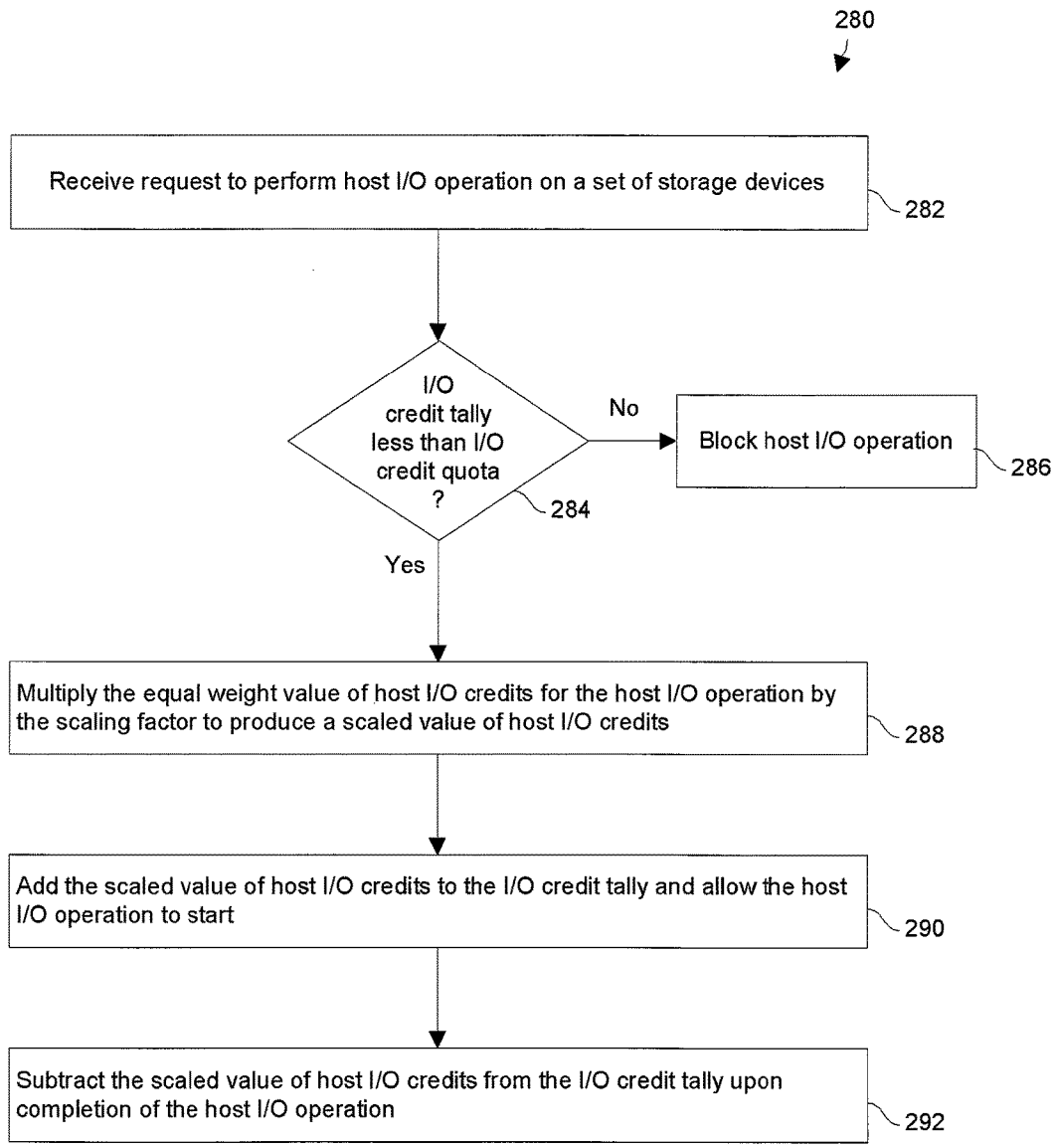
FIG. 6 is a flowchart of another portion of the procedure of FIG. 4.

FIGS. 5 and 6 show flowcharts of particular processes performed by the data storage system 24 when carrying out the procedure 200 (FIG. 4). In particular, FIG. 5 is a flowchart of a process 240 which is performed for each request to perform a host I/O operation 42(H) when the data storage system 24 is not performing a rebuild (e.g., see 204 and 208 in FIG. 4). In contrast, FIG. 6 is a flowchart 280 a process 280 which is performed for each request to perform a host I/O operation 42(H) when the data storage system 24 is rebuilding a storage device 30 (e.g., see 206 in FIG. 4). The process 280 is similar to the process 240 except that the process 280 accounts for host I/O operations 42(H) using a scaled values for host I/O credits.

With reference to the process 240 in FIG. 5, at 242, the specialized circuitry 100 (also see FIG. 3) receives a request to perform a host I/O operation 42(H) on a set of storage devices 30. It should be understood that the particular number of I/O credits (e.g., 4, 6, 8, 16, etc.) for the host I/O operation 42(H) is based on the particular type of host I/O operation 42(H) (e.g., read, write, read-modify-write, etc.) and the particular type of fault tolerance performed by the set of storage devices 30 (e.g., RAID 1, RAID 5, RAID 10, etc.).

At 244, the specialized circuitry 100 compares the current I/O credit tally 124 with the I/O credit quota 120 for the set of storage devices 30. If the current I/O credit tally 124 is not less than the I/O credit quota 120, the specialized circuitry 100 proceeds to 246. However, if the current I/O credit tally 124 is less than the I/O credit quota 120, the specialized circuitry 100 proceeds to 248.

At 246, the specialized circuitry 100 blocks the host I/O operation 42(H) from starting. In this manner, the specialized circuitry 100 prevents the set of storage devices 30 from handling too many I/O operations 42 at once. At this point, the request to perform the host I/O operation 42(H) can be delayed, queued, retried, etc.

At 248, the current I/O credit tally 124 is less than the I/O credit quota 120. Accordingly, the specialized circuitry 100 adds the equal weight value of the host I/O credits to the I/O credit tally 124 and allows the host I/O operation 42(H) to start.

At 250, the specialized circuitry 100 subtracts the equal weight value of the host I/O credits from the I/O credit tally 124 upon completion of the host I/O operation 42(H).

In contrast to the process 240 in FIG. 5, the process 280 in FIG. 6 is carried out for each request to perform a host I/O operation 42(H) while the data storage equipment 24 performs a rebuild. At 282, the specialized circuitry 100 (FIG. 3) receives a request to perform a host I/O operation 42(H) on the set of storage devices 30.

At 284, the specialized circuitry 100 compares the current I/O credit tally 124 with the I/O credit quota 120 for the set of storage devices 30. If the current I/O credit tally 124 is not less than the I/O credit quota 120, the specialized circuitry 100 proceeds to 286. However, if the current I/O credit tally 124 is less than the I/O credit quota 120, the specialized circuitry 100 proceeds to 288.

At 286, the specialized circuitry 100 blocks the host I/O operation 42(H) from starting. In this manner, the specialized circuitry 100 prevents the set of storage devices 30 from handling too many I/O operations at once. Moreover, due to use of the scaling factor 122, I/O capacity is reserved for the reconstruction I/O operations 42(R) (FIG. 3). At this point, the request to perform the host I/O operation 42(H) can be delayed, queued, retried, etc.

At 288, the specialized circuitry 100 multiplies the equal weight value of the host I/O credits for the host I/O operation 42(H) by the scaling factor 122 to product a scaled value of host I/O credits. For example, if the equal weight value for the host I/O operation 42(H) is 4 and the scaling factor is 3, the scaled value of host I/O credits for the host I/O operation 42(H) is 12 (i.e., 4×3=12).

At 290, the specialized circuitry 100 adds the scaled value of the host I/O credits (rather than the host I/O credits at equal weight) to the I/O credit tally 124 and allows the host I/O operation 42(H) to start. Accordingly, there is now some I/O capacity reserved for the set of storage devices 30. In this manner, the specialized circuitry 100 reduces the I/O loading on the set of storage devices 30 to allow the rebuild to make effective progress.

At 292, the specialized circuitry 100 subtracts the scaled value of the host I/O credits from the I/O credit tally 124 upon completion of the host I/O operation 42(H). Such operation continues while the data storage equipment 24 performs the rebuild procedure.

As described above, improved techniques are directed to performing I/O operations 42 on a set of storage devices 30 based on scalable I/O credits. In particular, when there is no rebuild process performed on the set of storage devices 30, credits for I/O operations 42 for host computers 22 are accounted for at equal weight. However, when there is a rebuild process being performed on the set of storage devices 30, the credits for I/O operations 42 for the host computers 22 are accounted for at higher weight based on a scaling factor 122. Such operation lowers the loading on the set of storage devices 30 from host I/O operations 42 during the rebuild process thus allowing the rebuild process to progress at an improved rate.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components such as the host computers 22 of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that use of the above-described I/O priority technique improves the rate at which a storage device is rebuilt with competing user I/O. That is, the more user I/O that is allowed to a RAID group that is rebuilding, the more that rebuild performance suffers. However, the priority technique backs off on the user I/O to allow the rebuild to maintain a reasonable rate while at the same time attempting to not be too impactful to user I/O.

In particular, in a situation where a given RAID group is known to be able to process a certain amount of I/O before becoming saturated, the total number of credits available on the RAID Group is essentially the total amount of I/O's are allowed to be in flight on the storage devices of the RAID Group at any given time. When an I/O arrives, the number of available credits is decreased, and when an I/O completes the number of available credits is increased. When there are no available credits, the I/O's are either queued or rejected and tell the client/source of the I/O's (e.g., the cache of the data storage equipment 24) to retry later.

To improve this credit system, the technique modifies the number of credits consumed by each user I/O during a rebuild. In fact, the technique increases the number of credits consumed by a scaling multiplier. Such a technique increases the impact of each I/O so that fewer total I/O's are started on the RAID Group. Since fewer user I/O's are started, it means that every I/O the rebuild performs has fewer user I/O's to compete with. This improves the response time for every rebuild request and in turn allows the RAID Group to make faster progress. Moreover, the scaling multipliers can be modified in order to change the impact of user I/O and thus change the rebuild rate.

In view of the improved techniques disclosed herein, more disk resources are dedicated to rebuilds. That is, the techniques back off on user I/O's enough to allow the rebuilds to make progress, but not so much that the user I/O's suffers dramatically. Such modifications and enhancements are intended to belong to various embodiments of the disclosure.

What is claimed is:

1. In data storage equipment, a method of performing input/output (I/O) operations on a set of storage devices, the method comprising:

configuring the data storage equipment to (i) allow host I/O operations to start on the set of storage devices while a credit tally for the set of storage devices is less than a predefined credit quota and (ii) block host I/O operations from starting on the set of storage devices while the credit tally for the set of storage devices is greater than the predefined credit quota;

after configuring the data storage equipment and during a first operational time period in which a rebuild procedure is not being performed on the set of storage devices, (i) allocating host I/O credits at equal weight to the credit tally upon starting first host I/O operations on the set of storage devices and (ii) de-allocating the host I/O credits at equal weight from the credit tally upon completion of the first host I/O operations on the set of storage devices; and after the first operational time period and during a second operational time period in which the rebuild procedure is being performed on the set of storage devices, (i) allocating host I/O credits at greater than equal weight to the credit tally upon starting second host I/O operations on the set of storage devices and (ii) de-allocating the host I/O credits at greater than equal weight from the credit tally upon completion of the second host I/O operations on the set of storage devices.

2. A method as in claim 1 wherein allocating the host I/O credits at greater than equal weight to the credit tally upon starting the second host I/O operations on the set of storage devices includes:
when starting a particular second host I/O operation on the set of storage devices, multiplying an original host I/O credit value for the particular second host I/O operation by a scaling factor to form a scaled host I/O credit value for the particular second host I/O operation, and adding the scaled host I/O credit value for the particular second host I/O operation to the credit tally.

3. A method as in claim 2 wherein de-allocating the host I/O credits at greater than equal weight from the credit tally upon completion of the second host I/O operations on the set of storage devices includes:
when completing the particular second host I/O operation on the set of storage devices, subtracting the scaled host I/O credit value for the particular second host I/O operation from the credit tally.

4. A method as in claim 3 wherein allocating the host I/O credits at equal weight to the credit tally upon starting the first host I/O operations on the set of storage devices includes:
when starting a particular first host I/O operation on the set of storage devices, adding an original host I/O credit value for the particular first host I/O operation to the credit tally without using the scaling factor, and
wherein de-allocating the host I/O credits at equal weight from the credit tally upon completion of the first host I/O operations on the set of storage devices includes:
when completing the particular first host I/O operation on the set of storage devices, subtracting the original host I/O credit value for the particular first host I/O operation from the credit tally.

5. A method as in claim 2, further comprising:
during the second operational time period and while the second host I/O operations are being performed on the set of storage devices, performing reconstruction I/O operations on the set of storage devices to reconstruct data on the set of storage devices.

6. A method as in claim 5, further comprising:
during the second operational time period and while the second host I/O operations are being performed on the set of storage devices, (i) allocating reconstruction I/O credits at equal weight to the credit tally upon starting the reconstruction I/O operations on the set of storage devices, and (ii) de-allocating the reconstruction I/O credits at equal weight from the credit tally upon completion of the reconstruction I/O operations on the set of storage devices.

7. A method as in claim 2 wherein multiplying the original host I/O credit value for the particular second host I/O operation by the scaling factor to form the scaled host I/O credit value for the particular second host I/O operation includes:
multiplying the original host I/O credit value for the particular second host I/O operation by an integer N to form the scaled host I/O credit value for the particular second host I/O operation, the integer N being greater than 1, and the scaled host I/O credit value being N times greater than the original host I/O credit value.

8. A method as in claim 7 wherein the scaling factor is originally set to an integer M which is greater than 1 and which is different than the integer N; and wherein the method further comprises:
during the first operational time period, receiving a scaling factor change command from a user and, in response to the scaling factor change command from the user, modifying the scaling factor from the integer M to the integer N.

9. A method as in claim 1, further comprising:
during the first operational time period, performing the first host I/O operations on the set of storage devices to enable an external host to access host information on the set of storage devices, and
during the second operational time period, performing the second host I/O operations and reconstruction I/O operations on the set of storage devices to concurrently enable the external host to access the host information on the set of storage devices and reconstruct data on the set of storage devices.

10. A method as in claim 9, further comprising:
after completion of the rebuild procedure and during a third operational time period following the second operational time period, (i) allocating host I/O credits at equal weight to the credit tally upon starting third host I/O operations on the set of storage devices and (ii) de-allocating the host I/O credits at equal weight from the credit tally upon completion of the third host I/O operations on the set of storage devices.

11. Data storage equipment, comprising:
an interface;
memory including a set of storage devices; and
processing circuitry coupled to the interface and to the memory, the memory storing instructions which, when carried out by the control circuitry, cause the processing circuitry to:
receive, through the interface, configuration to (i) allow host I/O operations to start on the set of storage devices while a credit tally for the set of storage devices is less than a predefined credit quota and (ii) block host I/O operations from starting on the set of storage devices while the credit tally for the set of storage devices is greater than the predefined credit quota,
after receiving the configuration and during a first operational time period in which a rebuild procedure is not being performed on the set of storage devices, (i) allocate host I/O credits at equal weight to the credit tally upon starting first host I/O operations on the set of storage devices and (ii) de-allocate the host I/O credits at equal weight from the credit tally upon completion of the first host I/O operations on the set of storage devices, and
after the first operational time period and during a second operational time period in which the rebuild procedure is being performed on the set of storage devices, (i) allocate host I/O credits at greater than equal weight to the credit tally upon starting second host I/O operations on the set of storage devices and (ii) de-allocate the host I/O credits at greater than equal weight from the credit tally upon completion of the second host I/O operations on the set of storage devices.

12. Data storage equipment as in claim 11 wherein the processing circuitry, when allocating the host I/O credits at greater than equal weight to the credit tally upon starting the second host I/O operations on the set of storage devices, is constructed and arranged to:
when starting a particular second host I/O operation on the set of storage devices, multiply an original host I/O credit value for the particular second host I/O operation by a scaling factor to form a scaled host I/O credit value for the particular second host I/O operation, and add the scaled host I/O credit value for the particular second host I/O operation to the credit tally.

13. Data storage equipment as in claim 12 wherein the processing circuitry, when de-allocating the host I/O credits at greater than equal weight from the credit tally upon completion of the second host I/O operations on the set of storage devices, is constructed and arranged to:
when completing the particular second host I/O operation on the set of storage devices, subtract the scaled host I/O credit value for the particular second host I/O operation from the credit tally.

14. Data storage equipment as in claim 13 wherein the processing circuitry is further constructed and arranged to:
during the second operational time period and while the second host I/O operations are being performed on the set of storage devices, perform reconstruction I/O operations on the set of storage devices to reconstruct data on the set of storage devices.

15. Data storage equipment as in claim 14 wherein the processing circuitry, when multiplying the original host I/O credit value for the particular second host I/O operation by the scaling factor to form the scaled host I/O credit value for the particular second host I/O operation, is constructed and arranged to:
multiply the original host I/O credit value for the particular second host I/O operation by an integer N to form the scaled host I/O credit value for the particular second host I/O operation, the integer N being greater than 1, and the scaled host I/O credit value being N times greater than the original host I/O credit value.

16. A computer program product having a non-transitory computer readable medium which stores a set of instructions to perform input/output (I/O) operations on a set of storage devices, the set of instructions, when carried out by computerized circuitry, causing the computerized circuitry to perform a method of:
configuring data storage equipment to (i) allow host I/O operations to start on the set of storage devices while a credit tally for the set of storage devices is less than a predefined credit quota and (ii) block host I/O operations from starting on the set of storage devices while the credit tally for the set of storage devices is greater than the predefined credit quota;
after configuring the data storage equipment and during a first operational time period in which a rebuild procedure is not being performed on the set of storage devices, (i) allocating host I/O credits at equal weight to the credit tally upon starting first host I/O operations on the set of storage devices and (ii) de-allocating the host I/O credits at equal weight from the credit tally upon completion of the first host I/O operations on the set of storage devices; and
after the first operational time period and during a second operational time period in which the rebuild procedure is being performed on the set of storage devices, (i) allocating host I/O credits at greater than equal weight to the credit tally upon starting second host I/O operations on the set of storage devices and (ii) de-allocating the host I/O credits at greater than equal weight from the credit tally upon completion of the second host I/O operations on the set of storage devices.

17. A computer program product as in claim 16 wherein allocating the host I/O credits at greater than equal weight to the credit tally upon starting the second host I/O operations on the set of storage devices includes:
when starting a particular second host I/O operation on the set of storage devices, multiplying an original host I/O credit value for the particular second host I/O operation by a scaling factor to form a scaled host I/O credit value for the particular second host I/O operation, and adding the scaled host I/O credit value for the particular second host I/O operation to the credit tally.

18. A computer program product as in claim 17 wherein de-allocating the host I/O credits at greater than equal weight from the credit tally upon completion of the second host I/O operations on the set of storage devices includes:
when completing the particular second host I/O operation on the set of storage devices, subtracting the scaled host I/O credit value for the particular second host I/O operation from the credit tally.

19. A computer program product as in claim 18, further comprising:
during the first operational time period, performing the first host I/O operations on the set of storage devices to enable an external host to access host information on the set of storage devices, and
during the second operational time period, performing the second host I/O operations and reconstruction I/O operations on the set of storage devices to concurrently enable the external host to access the host information on the set of storage devices and reconstruct data on the set of storage devices.

20. A computer program product as in claim 19 wherein multiplying the original host I/O credit value for the particular second host I/O operation by the scaling factor to form the scaled host I/O credit value for the particular second host I/O operation includes:
multiplying the original host I/O credit value for the particular second host I/O operation by an integer N to form the scaled host I/O credit value for the particular second host I/O operation, the integer N being greater than 1, and the scaled host I/O credit value being N times greater than the original host I/O credit value.

* * * * *